US005261639A

United States Patent [19]

Bantien et al.

[11] Patent Number: 5,261,639

[45] Date of Patent: Nov. 16, 1993

[54] VALVE

[75] Inventors: Frank Bantien, Ditzingen; Udo Jauernig; Hans-Peter Trah, both of Reutlingen; Kurt Weiblen, Metzingen, all of Fed. Rep. of Germany

[73] Assignee: Robert Bosch GmbH, Stuttgart, Fed. Rep. of Germany

[21] Appl. No.: 974,014

[22] Filed: Nov. 10, 1992

[30] Foreign Application Priority Data

Nov. 11, 1991 [DE] Fed. Rep. of Germany ....... 4136957
Jan. 29, 1992 [DE] Fed. Rep. of Germany ....... 4202387

[51] Int. Cl.[5] ........................ F16K 7/14; F16K 31/06; B05B 1/02

[52] U.S. Cl. ................................ 251/331; 239/585.1; 239/584; 251/368

[58] Field of Search ............................... 251/331, 368; 239/590.3, 596, 584, 585.1

[56] References Cited

U.S. PATENT DOCUMENTS 4,647,013 3/1987 Giachino et al. .................. 251/331
4,907,748 3/1990 Gardner et al. ................ 251/331 X
5,127,625 7/1992 Kleinhappl ..................... 251/331 X

*Primary Examiner*—Arnold Rosenthal
*Attorney, Agent, or Firm*—Edwin E. Greigg; Ronald E. Greigg

[57] ABSTRACT

A valve for metering a fluid including a small upper plate, a small middle plate and a small lower plate. The small middle plate has a closing element with a diaphragm region surrounding the closing element. The stroke of the closing element is limited in an axial direction by the small upper plate and by a valve seat of the small lower plate. As a result, very accurate metering of the fluid is possible. The valve is especially suitable as an injection valve for injection systems of mixture-compressing internal combustion engines with externally supplied ignition.

16 Claims, 2 Drawing Sheets

VALVE

BACKGROUND OF THE INVENTION

The invention is based on a valve as defined hereinafter. U.S. Pat. No. 4,647,013 has already disclosed a valve for metering a fluid, which has an actuation member, a small upper plate having an actuation opening for the actuation member, and a small lower plate having a plurality of injection ports. For opening the valve, the actuation member executes a stroke that moves the small lower plate with its injection ports away from the small upper plate and thus establishes a flow for the fluid through the valve. To uncover the opening cross section of the valve, a comparatively long stroke of the actuation member is needed. Furthermore, there is no provision for limiting the deformation of the small lower plate, for instance by providing a stop, so that a defined and constant opening cross section of the valve is not assured. The pressure of the fluid flowing through the valve exerts influence upon the size of the opening cross section of the valve, because the fluid deforms the small lower plate, and the small lower plate as a result moves farther away from the small upper plate in the region of its injection ports. Because of its severe deformation, the small lower plate runs the risk of breaking.

OBJECT AND SUMMARY OF THE INVENTION

The valve according to the invention has the advantage over the prior art that the actuation member and the closing part execute only comparatively short strokes for opening or closing off the opening cross section of the valve. A closing force is exerted by the actuation member upon the closing part, that presses the closing part against the small lower plate and thus blocks the flow through the valve. The opening stroke of the closing part is limited by contact of the closing part on the small upper plate, sc that in all operating states the adherence to a defined opening cross section of the valve is assured. Because of the short stroke of the actuation member and of the closing part, it is possible for the demands made of the drive unit of the actuation member to be less stringent, and the danger of a defect in the valve from damage to the diaphragm part or closing part can be prevented.

It is especially advantageous if an inflow chamber is formed in the axial direction between the diaphragm region of the small middle plate and the small lower plate, and in this inflow chamber an opening pressure prevails that urges the closing part toward the small upper plate. In this way, if the actuation member is not exerting compressive force on the closing part, then the closing part is pressed against the small upper plate, so that a maximally pressure-independent opening cross section of the valve is assured. The shutoff of the valve is then effected by the imposition of a closing force by the actuation member upon the closing part, so that the closing part is pressed against the small lower plate, and the opening cross section of the valve is blocked off.

For a very simple valve structure, it is advantageous if the pressure of the fluid delivered to the valve serves as the opening pressure.

It is advantageous if the small upper plate, the small middle plate and the small lower plate are made of silicon, and their recesses are formed by anisotropic etching. In this way, the small plates of the valve can be embodied quite simply, economically, and especially accurately.

For a connection between the small plates that is especially leakproof and simple to establish, it is advantageous if the small upper plate is joined by bonding to the small middle plate and the small middle plate is joined by bonding to the small lower plate.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
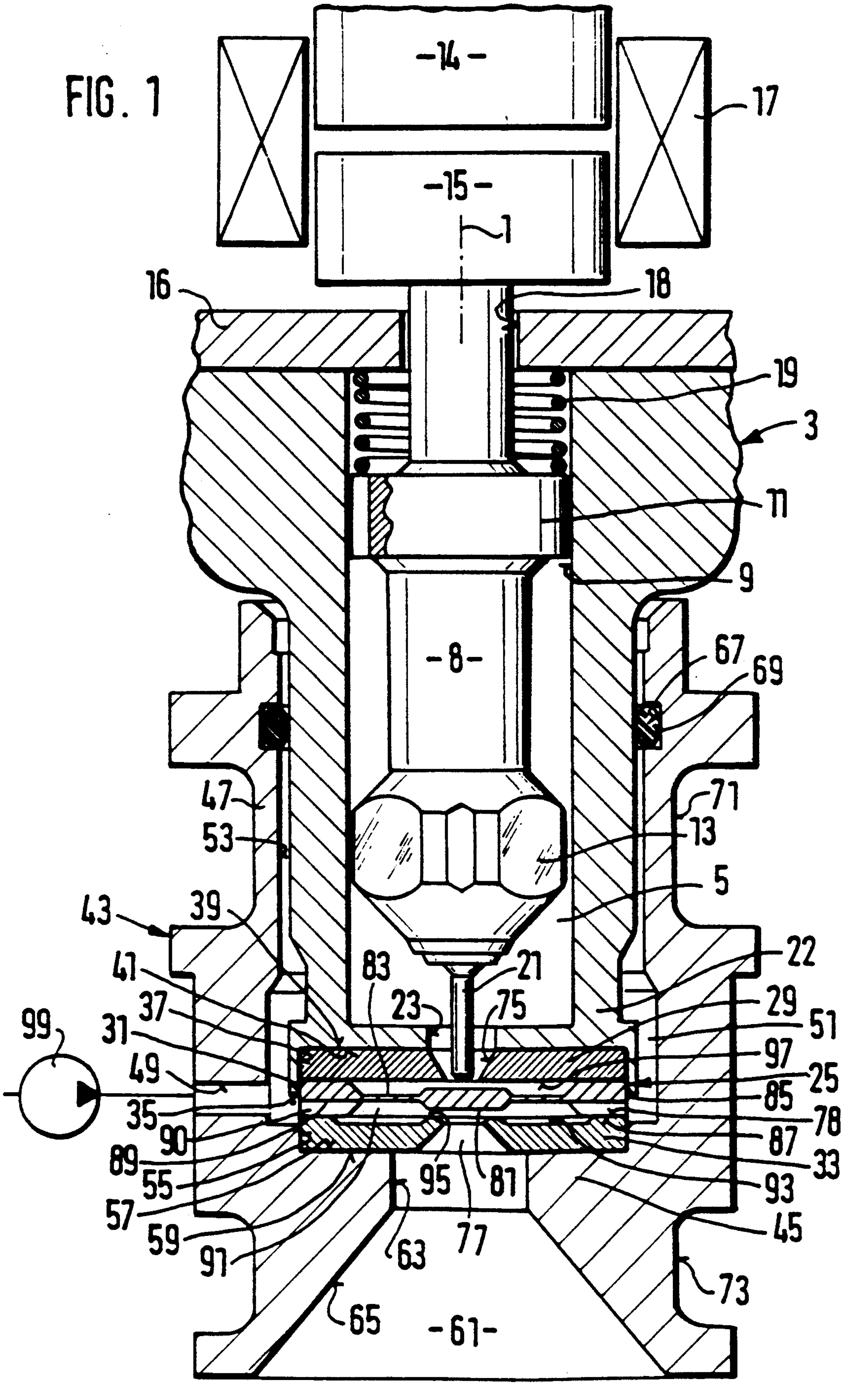
FIGS. 1, as an exemplary embodiment, is a fragmentary view of a valve embodied according to the invention.

FIG. 1 is a fragmentary view of a fuel injection valve in accordance with an exemplary embodiment of the invention, which for instance can be used for injection systems in mixture-compressing internal combustion engines with externally supplied ignition. A support body 3 of the valve embodied of a ferromagnetic material, for instance, has a stepped, through bore 5 concentric with a longitudinal valve axis 1. An actuation needle 8 is disposed in the through bore 5. The through bore 5 of the support body 3 has a cylindrical guide segment 9 that serves to guide the actuation needle 8 in its axial motion. To that end, the actuation needle 8 has a guide collar 13, which is spaced apart slightly in the radial direction from the guide segment 9 of the through bore 5.

The axial motion of the actuation needle 8 and thus the opening and closing of the valve take place electromagnetically in a known manner, for example. As suggested in FIG. 1, the actuation needle 8 is joined on its end protruding out of the support body 3 to an armature 15, which cooperates with a core 14 and a magnet coil 17. Between its guide collar 13 and the armature 15, the actuation needle 8 has an upper retaining collar 11 pointing radially outward, which has a slight radial spacing from the wall of the guide segment 9 of the through bore 5 and may optionally be provided with lengthwise grooves for the sake of a better flow around it.

In the support body 3, an annular disk 16 is disposed axially between the retaining collar 11 of the actuation needle 8 and the armature 15; it has a through bore 18, extending concentrically with the longitudinal valve axis, through which bore the actuation needle 8 protrudes. A compression spring 19 is provided between the disk 16 and the retaining collar 11 and urges the actuation needle 8 in the direction remote from the magnet coil 17. Advantageously, the actuation of the actuation needle 8 may also be done piezoelectrically.

On its end remote from the armature 15, the actuation needle 8 has a pin-shaped actuation member 21 embodied concentrically with the longitudinal valve axis 1. Adjoining the guide segment 9 of the through bore 5, a through opening 23 of the through bore 5 is formed on the lower end 22 of the support body 3 remote from the magnet coil 17, which has a substantially smaller diameter than the guide segment 9 and through which the actuation needle 8 protrudes with its actuation member 21. On the lower end 22 of the support body 3, adjoining the through opening 23, there is a perforated body 25. The perforated body 25 comprises a small upper plate 29, for instance square, which rests on the support body 3, a square small middle plate 31, and a square lower small plate 33.

The small upper plate 29, the small middle plate 31 and the small lower plate 33 are made of monocrystalline silicon, for example. The small upper plate 29 is joined to the small middle plate 31, and the small middle plate 31 is joined to the small lower plate 33, by bonding. In a bonding process, the face ends to be joined together are first polished and the surfaces are chemically treated. Next, the prepared surfaces of the small plates to be joined together are put together at room temperature. The bonding process is ended by a temperature treatment of the plates in a nitrogen atmosphere, for instance. Besides the use of monocrystalline silicon, it is also possible to select some other suitable material, such as a different monocrystalline semiconductor like germanium, or a connecting semiconductor such as gallium arsenide. The axial thickness of the small upper plate 29, small middle plate 31 and small lower plate 33 is approximately 0.2 to 0.5 mm each, preferably approximately 0.3 mm.

To assure a constant position of the perforated body 25 relative to the support body 3 and to prevent horizontal displacement of the perforated body 25 relative to the longitudinal valve axis 1, a recess 37 is formed in one end face 35 of the lower end 22 of the support body 3, in such a shape that the recess 37 fits partway around the perforated body 25, and the upper chip 29 rests with its upper face end 39 remote from the middle chip 31 tightly on a bottom 41 of the recess 37. The support body 3 is surrounded on its lower end 22, for instance, by a delivery bush 43, as well as being surrounded in the radial direction by a bottom part 45 and being partly surrounded in the axial direction by a cylindrical part 47. The delivery bush 43 is firmly joined to the support body 3, for instance by an adhesive bond, a detent connection, or a crimped connection, and is thus fixed in the axial direction relative to the support body. In the axial direction in the region of the perforated body 25, the cup-shaped delivery bush 43 has continuous crosswise openings 49, for instance three in number, in its cylindrical part 47; these openings extend radially from the circumference of the cylindrical part 47 through its wall inward into an annular delivery chamber 51, which is formed in the radial direction between the circumference of the support body 3 or of the perforated body 25 and a stepped longitudinal bore 53 of the delivery bush 43, this bore being defined in the radial direction by the cylindrical part 47.

In the bottom part 45 of the delivery bush 43, a recess 55 is formed, oriented toward the support body 3. The delivery bush 43 rests tightly with a smooth contact face 57 of the recess 55 on a lower face end 59 of the small lower plate 33 of the perforated body 25, this face end being remote from the small middle plate 31. In this way, the axial position of the perforated body 25 is reliably fixed, and a displacement of the perforated body in the direction of the longitudinal valve axis 1 and at right angles to it is prevented. Remote from the perforated body 25, the recess 55 is adjoined in the bottom part 25 of the delivery bush 43 by an outflow opening 61, which has a cylindrical first segment 63 toward the perforated body 25 and adjoining that it has a second segment 65 that widens frustoconically.

In the longitudinal bore 53 of the delivery bush 43, on its end remote from the for instance three transverse openings 49, there is a first annular groove 67, which receives a sealing ring 69. The sealing ring 69 rests tightly against the circumference of the support body 3 and forms a seal between the circumference of the support body 3 and the wall of the longitudinal bore 53 of the delivery bush 43.

If the valve with its delivery bush 43 is installed in a valve receptacle, for instance in an intake line of the engine, then it is necessary for the delivery bush 43 to be sealed off from the wall of the valve receptacle above and below its crosswise openings 49. To that end, a second annular groove 71 is formed out of the circumference of the delivery bush 43, above the crosswise opening 49 of the magnet coil 17, and a third annular groove 73 is formed out, for instance on the bottom part 45, below the crosswise openings 49; a sealing ring can be disposed in both the second and third annular grooves.

Figure 2:
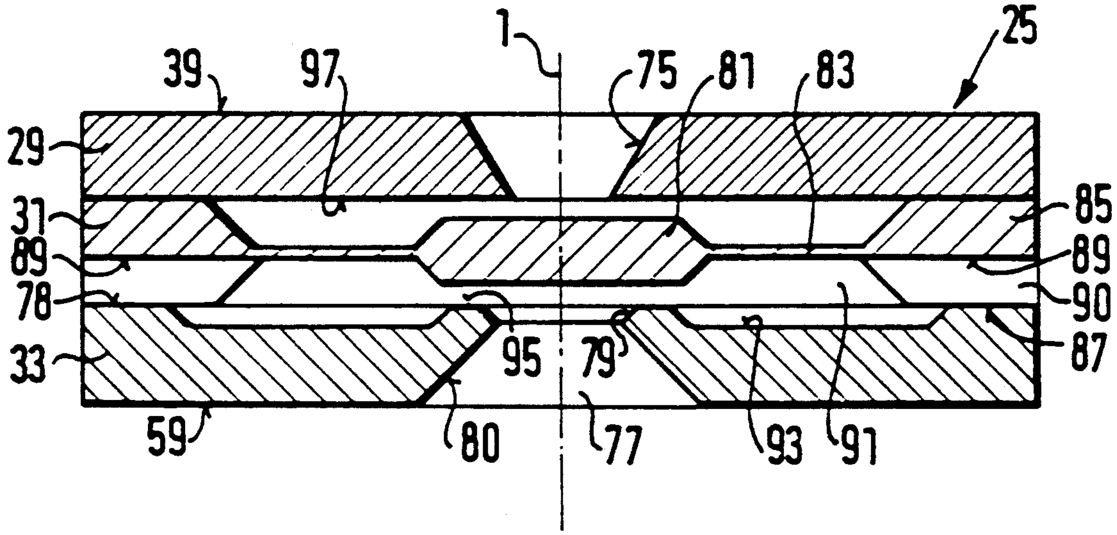
FIG. 2 is a front view of a perforated body of the valve according to the exemplary embodiment, the perforated body comprising a small upper plate, a small middle plate, and a small lower plate.

FIG. 2 shows the perforated body 25, comprising the small upper plate 29, small middle plate 31 and small lower plate 33, in accordance with the exemplary embodiment of the valve shown in FIG. 1. The plates 29, 31, 33 are square and as shown in FIGS. 1 and 2 have identical dimensions in terms of the circumferential shape. A continuous actuation opening 75 is provided in the small upper plate 29, beginning at its upper face end 39 and extending concentrically with the longitudinal valve axis 1; this opening tapers toward the small middle plate 31 in the form of a truncated pyramid and is for instance square. The small lower plate 33 shown in FIGS. 1 and 2 has an injection port 77 that extends through the small lower plate, for instance concentrically with the longitudinal valve axis 1. The injection port 77 has a square first segment 79, tapering in the form of a truncated pyramid, toward the outflow opening 61, beginning at an upper face end 78 of the small lower plate 33 oriented toward the small middle plate 31, and adjoining it it has a square second segment 80, widening in the form of a truncated pyramid and oriented toward the outflow opening 61. Naturally, two or more injection ports 77, distributed about the longitudinal valve axis 1, may also be provided. Concentrically with the longitudinal valve axis 1, the small middle plate 31 has a plate-shaped closing element 81, which in the pressureless state, without actuation by the actuation needle 8, is located axially spaced apart from and approximately in the middle between the small upper plate 29 and the small lower plate 33; the valve is accordingly open. The closing part 81, on its circumference, is radially surrounded by an annularly embodied diaphragm region 83, having a reduced wall thickness in the direction of the longitudinal valve axis 1, this region being elastically deformable and formed in the middle between the small upper plate 29 and the small lower plate 33. Radially adjoining the diaphragm region 83 toward the outside, the small middle plate 31 has a support region 85 extending as far as the circumference of the small middle plate; with this support region the small middle plate 31 rests on the small upper plate 29 and the small lower plate 33, and this support region is accordingly thicker in the axial direction than the closing element 81. The closing element 81 of the small middle plate 31 protrudes radially past the first segment 79 of the injection port 77 and serves to block off the injection port 77 of the small lower plate 33 on its upper face end 78.

In the support region 85 of the small middle plate 31, beginning at its lower face end 87 oriented toward the small lower plate 33, there is at least one recess 89, and by way of example four recesses 89 are formed, which extend radially between the circumference of the small middle plate 31 and the diaphragm region 83 The recesses 89 of the small middle plate 31, together with the upper face end 78 of the small lower plate 33, form fluid inflow conduits 90. An annular inflow chamber 91 is formed in the axial direction between the small lower plate 33 and the diaphragm region 83 of the small middle plate 31. An annular groove 93 extending toward the lower face end 59 is formed in the upper face end 78 of the small lower plate 33. The annular groove 93 extends radially between the recess 89 and the closing element 81 and forms part of the inflow chamber 91. In the radial direction between the annular groove 93 and the injection port 77, the small lower plate 33 has, on its upper face end 78, an annular valve seat 95 which surrounds the injection port 77 and with which the closing element 81 cooperates.

The actuation opening 75 of the small upper plate 29, the injection port 77, and the annular groove 93 of the small lower plate 33, along with the closing element 81, the diaphragm region 83 and the recess 89 of the small middle plate 31, are formed trapezoidally or in the form of a truncated pyramid, for instance by anisotropic etching. The delivery of the fluid, such as fuel, to the annular feed valves 95 is made through the crosswise openings 49 of the delivery bush 43, the delivery chamber 51, and the fluid inflow conduits 90 of the perforated body 25 formed by the recesses 89, into the annular inflow chamber 91 formed between the small middle plate 31 and the small lower plate 33. The pressure of the delivered fuel that is to be metered prevails in the inflow chamber 91. This pressure acts as an opening pressure upon the diaphragm region 83 and the closing element 81 of the small middle plate 31, and it urges the closing element 81 to move in the direction of a lower face end 97 of the small upper plate 29, oriented toward the small middle plate 31. The pressure of the fuel, which for instance is to be metered, is then equivalent to the system pressure of a supply pump 99 shown in FIG. 1, by way of example.

The pressure prevailing between the small middle plate 31 and the small upper plate 29 acts upon the diaphragm region 83 and the closing element 81 of the small middle plate 31 counter to the opening pressure prevailing in the inflow chamber 91. This counteracting pressure, which also prevails in the through bore 5 of the support body 3, is equivalent for instance either to the return pressure of the uninjected fluid to a supply container, or to the intake tube pressure that prevails in the region of the intake tube at the outflow opening 61. Since as a rule the intake tube pressure is lower than atmospheric pressure, in this case the opening pressure in the inflow chamber 91 need not act counter to a closing pressure acting in the opposite direction.

The spring stiffness of the diaphragm region 83 is designed such that the closing element 81 of the small middle plate 31 is already pressed against the lower face end 97 of the small upper plate 29 at a relatively slight fluid pressure prevailing in the inflow chamber 91. This results in a largely pressure-independent, defined opening cross section of the valve. The actuating needle 8 with its actuation member 21 acts to close the valve in the unexcited state of the magnet coil 17 and to block off the flow, in that the actuation member 21 is pressed against the valve seat 95 by the spring force of the compression spring 19 of the closing element 81 of the small middle plate 31, counter to the opening pressure of the fluid to be metered. The actuation member 21 protrudes through the actuation opening 75 of the small upper plate 29 in this process. To open the valve and enable a flow of the fluid past the valve seat 95, the magnet coil 17 is excited, for instance, so that the actuation needle 8 with its armature 15 executes a motion in the direction remote from the closing direction 81, counter to the spring force of the compression spring 19. FIG. 1 shows the open position of the valve. As a result of the symmetrical embodiment of the diaphragm region 83 and closing element 81 of the small middle plate 31 between the small upper plate 29 and the small lower plate 31, only half the stroke is needed to open or close the valve in either direction; as a result the edge length of the diaphragm region 83 and thus the size of the perforated body 25 can be kept small.

The perforated body 25 can be used not only with fuel injection valves but also to atomize other fluids. In other words whenever superfine liquid droplets are needed, for example for uniform spraying of paints and lacquers, and in manufacturing processes or the like.

The valve with the perforated body 25 having the small upper plate 29, small middle plate 31 and small lower plate 33, has the advantage that the actuation member 21 and thus the closing element 81 need to execute only a comparatively short stroke to close or open the valve. In addition, the stroke of the closing element 81 is limited in the axial direction by a contact with the valve seat 95 or with the lower face end 97 of the small upper plate 29, so that very exact metering of the fluid, such as a fuel, is assured.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fueled injection valve for metering a fluid, having an actuation member disposed concentrically with a longitudinal valve axis; a perforated body (25) having a small upper plate with an actuation opening for the actuation member; and further having a small lower plate provided with at least one injection port; a small middle plate (31) is disposed, between the small upper plate (29) and the small lower plate (33), said small middle plate including an elastically deformable diaphragm region (83), having a reduced wall thickness in a direction of a longitudinal valve axis (1), said small middle plate also has a closing element (81) surrounded radially by the diaphragm region (83) which serves to close the at least one injection port (77), and the small upper plate (29), the small middle plate (31) and the small lower plate (33) are embodied of silicon.

2. A valve as defined by claim 1, in which the small upper plate (29), the small middle plate (31) and the small lower plate (33) are embodied by anisotropic etching.

3. A valve as defined by claim 1, in which the small upper plate (29) is joined by bonding to the small middle plate (31) and the small middle plate (31) is joined by bonding to the small lower plate (33).

4. A valve as defined by claim 2, in which the small upper plate (29) is joined by bonding to the small middle plate (31) and the small middle plate (31) is joined by bonding to the small lower plate (33).

5. A fuel injection valve for metering a fluid, having an actuation member disposed concentrically with a longitudinal valve axis; a perforated body (25) having a small upper plate with an actuation opening for the actuation member; and further having a small lower plate provided with at least one injection port; a small middle plate (31) is disposed, between the small upper plate (29) and the small lower plate (33), said small middle plate including an elastically deformable diaphragm region (83), having a reduced wall thickness in a direction of a longitudinal valve axis (1), said small middle plate also has a closing element (81) surrounded radially by the diaphragm region (83) which serves to close the at least one injection port (77) and the small upper plate (29), the small middle plate (31) and the small lower plate (33) are embodied by anisotropic etching.

6. A valve as defined by claim 5, in which the small upper plate (29) is joined by bonding to the small middle plate (31) and the small middle plate (31) is joined by bonding to the small lower plate (33).

7. A valve as defined by claim 5, in which an inflow chamber (91) is formed in the axial direction between the diaphragm region (83) of the small middle plate (31) and the small lower plate (33), in which an opening pressure prevails that urges the closing element (81) in a direction of the small upper plate (29).

8. A valve as defined by claim 7, in which the pressure of the fluid delivered to the valve acts as an opening pressure.

9. A valve as defined by claim 5, in which a valve seat (95) surrounding the at least one injection port (77) is formed on an upper face end (78) of the small lower plate (33) oriented toward the small middle plate (31), with which valve seat the closing element (81) cooperates.

10. A valve as defined by claim 5, in which the closing element (81) is retained at an axial spacing form the small upper plate (29) and the small lower plate (33) by the diaphragm region (83) in the unactuated state.

11. A fuel injection valve for metering a fluid, having an actuation member disposed concentrically with a longitudinal valve axis; a perforated body (25) having a small upper plate with an actuation opening for the actuation member; and further having a small lower plate provided with at least one injection port; a small middle plate (31) is disposed, between the small upper plate (29) and the small lower plate (33), said small middle plate including an elastically deformable diaphragm region (83), having a reduced wall thickness in a direction of a longitudinal valve axis (1), said small middle plate also has a closing element (81) surrounded radially by the diaphragm region (83) which serves to close the at least one injection port (77) and in which at least one recess (89) is formed in the small middle plate (31), beginning at a lower face end (87) oriented toward the small lower plate (33), which recess extends radially between the circumference of the small middle plate (31) and the diaphragm region (83).

12. A valve as defined by claim 19, in which a fluid inflow conduit (90) is formed by a recess (89) of the small middle plate (31) and the upper face end (78) of the small lower plate (33).

13. A valve as defined by claim 11, in which an inflow chamber (91) is formed in the axial direction between the diaphragm region (83) of the small middle plate (31) and the small lower plate (33), in which an opening pressure prevails that urges the closing element (81) in a direction of the small upper plate (29).

14. A valve as defined by claim 13, in which the pressure of the fluid delivered to the valve acts as an opening pressure.

15. A valve as defined by claim 11, in which a valve seat (95) surrounding the at least one injection port (77) is formed on an upper face end (78) of the small lower plate (33) oriented toward the small middle plate (31), with which valve seat the closing element (81) cooperates.

16. A valve as defined by claim 11, in which the closing element (81) is retained at an axial spacing from the small upper plate (29) and the small lower plate (33) by the diaphragm region (83) in the unactuated state.

* * * * *